US006243908B1

(12) United States Patent
Battle et al.

(10) Patent No.: US 6,243,908 B1
(45) Date of Patent: Jun. 12, 2001

(54) TRACK CLEARANCE CARD AND METHODS OF MAKING AND USING THE SAME

(75) Inventors: William Froman Battle, Canton; Ronald G. Shell, Bloomfield Hills; Dawn M. Erickson, Westland, all of MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/288,591

(22) Filed: Apr. 8, 1999

Related U.S. Application Data

(60) Provisional application No. 60/081,150, filed on Apr. 9, 1998, now abandoned.

(51) Int. Cl.[7] ................................ B32B 3/02; B32B 3/10

(52) U.S. Cl. ...................... 15/210.1; 15/256.51; 428/119; 428/120; 428/132; 271/1

(58) Field of Search .................................... 428/119, 120, 428/132, 80, 81; 271/1; 15/208, DIG. 12, 210.1, 256.51

(56) References Cited

U.S. PATENT DOCUMENTS 5,153,964 * 10/1992 Gelardi et al. ...................... 15/210.1

* cited by examiner

*Primary Examiner*—Alexander S. Thomas
(74) *Attorney, Agent, or Firm*—David G. Rasmussen; Mark T. Starr

(57) ABSTRACT

A card is provided for cleaning a document track of a document handling system, and methods for making and using the same. The card includes a planar body formed of a resilient material, such as a fibrous or polymeric material. The body includes a plurality of tabs, with each one of the tabs being pivotable relative to the body between an extended position and a collapsed position. In the extended position, the tab projects angularly from the body, while in the collapsed position, the tab is substantially co-planar with the body. The tabs are biased to the extended position, such as by creasing the material forming the body. The biased tabs extend across the document track, and sweep debris along the document track.

18 Claims, 2 Drawing Sheets

TRACK CLEARANCE CARD AND METHODS OF MAKING AND USING THE SAME

This application claims benefit of provisional application 60/081,150 filed Apr. 9, 1998 now abandoned.

The invention involves a track clearing card that serves as a proxy document for clearing debris from a sheet transport path, along with methods of making and using the same.

FIELD OF INVENTION

The invention relates to the operation and use of high-speed document processing systems, and particularly to means for alleviating and avoiding problems common to the everyday operation of such systems. Particular attention is given to means for permitting the operators of such systems to resolve problems integral to their operation without recourse to costly and time-consuming skilled technical personnel, and while avoiding damage to delicate areas by the intervention of unskilled personnel and/or crude implements.

BACKGROUND OF THE DISCLOSURE

Those skilled in the art of high-speed document processing, such as the sorting of bank checks and like financial instruments, know that the art involves using of machines and systems to move and process documents at sustained rates of thousands of documents per minute. Such machines must perform multiple inter-related operations upon each document as the documents travel by. Such operations might include, but are not limited to, printing on a document by contact, dot-matrix, or ink-jet means, reading data previously encoded thereon, and recording an archival image of the document by photographic or electronic imaging processes.

Those skilled in the art will further understand that documents moving through such machines must be accurately positioned to be processed accurately. For example, if a document carries a previously encoded line of magnetic characters (known in the art as MICR characters) and the machine is equipped to read and decode such characters, then the machine must present the document to such reading system in correct alignment and position. Other machine systems have similar requirements for correct and reliable alignment and positioning of documents passing through.

Those skilled in the art will further understand that document-processing now mandates the use of continuous-feed machines, in which the documents are fed in a continuous stream at very high speed with only negligible gaps between them. The processing rates presently required by customers could not be achieved without using such machines. For example, the Unisys DP1800 is a high-speed document processing machine that will feed 1800 standard documents per minute at a nominal track speed of 300 inches per second (ips) (7.62 meters per second), with an inter-document interval of a mere one-hundredth of a second (10 milliseconds).

Those skilled in the art will understand that such brief inter-document intervals do not allow a document to be individually aligned and adjusted relative to any process station. Instead, the document must be kept properly aligned as it passes the stations at all times. Even in "slower" machines (e.g. the Unisys DP500, with a minimal track speed of 100 ips or (2.54 meters per second), the interval between documents is still too brief to permit alignment of the document at each individual station.

Those skilled in the art will also understand that such document speed and feed rates requires special transport means, such as high-speed special transport friction-drive rollers and belts that are serially arranged to drive the document from point to point. The documents typically are trapped between opposing sets of such rollers and belts, and are constrained from distortion by flanking walls provided by the document track. Various process stations are then mounted along the walls, so the walls must be constructed and adapted to permit the process stations to operate upon the passing documents. The need for such transport means and associated track walls is essentially independent of the speed of the document. , in machines of"moderate" speed, such as the Unisys DP30 or the Unisys Teller-Scanner with a minimal track speed of 15 ips or 0.38 meters per second) require such transport means and associated track walls as well as such high-speed machines such as the Unisys DP1800.

Machines here contemplated are designed along these lines, with one convenient construction characterized by a narrow vertical track channel, with walls whose height approaches the vertical height of the documents, typically on the order of 4 inches (100 millimeters). Such track walls may include apertures of various shapes and sizes to permit the driving means (rollers, belts and so on) to drivingly contact documents in the track. While the track is preferably straight for ease of construction and best document flow, it may also include turns and comers. One finds that good, consistent feeding and driving of documents is obtained if the channel has a very small lateral width relative to its height. Optimal track width will usually vary with document speed. As an example, the nominal track width of the DP1800 product, with a track speed of 300 ips, is 0.10 inches (2.5 millimeters). At lower speeds, narrower track widths may be employed, with consequent improvement in document handling and alignment. As speeds increase, the track width must be increased somewhat, since the increased kinetic energy of the document makes it more likely to jam if the track is too narrow. Those skilled in the art will readily understand the trade-off between optimal document alignment and consistent document feeding and transport.

Such a construction, however, tends to bring problems of operations and service which are difficult to anticipate. Even though document process rates are increasing, customers still require ever-better machine reliability. With higher potential document processing rates, the impact of an unscheduled stoppage, such as a jam in the track, becomes proportionally greater. Jams and other track disruptions are typically very destructive events, because the machine cannot be stopped quickly enough to avoid driving follow-on documents into the jam-site. The result is typically the destruction of documents, which are crushed, folded and torn. Also, the machine may be rendered unserviceable for extended periods while the track is cleared and the involved documents accounted for.

Thus, jams in a document transport must be prevented, and extensive engineering effort is expended to minimize their occurrence. However, as document feed-rates rise, and as the nature and quality of the documents to be processed becomes more and more varied, jams continue to happen. Thus, recovery from the occasional jam should be as swift and non-disruptive as possible so that it poses minimal risk of damage to the machinery.

Jams are generally caused by a "discrepant" document that is torn, folded, or otherwise mutilated, or caused by foreign objects such as staples and paper clips that are attached to or entrained with a document. No matter how vigilant a machine-operator may be in inspecting documents before they are fed, the sheer volumes handled ensure that occasionally a jam will occur. When a jam occurs, the operator must clear the jam, retrieve the documents, remove any debris from the track, and restart the machine as quickly as possible.

One approach to this problem is to hinge or otherwise modify one or other of the track walls to allow an operator to access the track and remove jammed documents or other obstructions. This technique offers varying degrees of success. In some cases, the operator has extensive, adequate access to a track and its contents, but in many other cases, access is limited or blocked by machine parts, such as a read element. Also, this technique may require that not only the track walls, but also the driving rollers and belts be made hinged or demountable in like manner. This hinged or demountable construction increases complexity, cost, and failure rate of these mechanisms. Further, some track elements cannot be so constructed, especially those track elements such as print heads, optical heads, magnetic read heads, that involve integral functions. Nevertheless, this approach may be suitable in certain applications.

However, there are cases where the above approach is difficult to employ, such as in and around a machine process station. These cases are becoming more numerous as customers ask that more processing be integrated into a machine. For such cases, one should develop alternative means for machine operators to clear jammed documents and debris from a document track.

Other approaches to this problem involved using manual "ad hoc tools" fashioned by operators themselves, along with methods readily accessible to the operator. Various hooks and other implements have been used to probe the closed sections of a jammed track in an effort to dislodge and extract documents and debris. Such devices as wire coat hangers, spring-hooks, buttonhooks, and knitting needles have all been used. However, such techniques often damage the track and other delicate process devices, such as read heads, print heads, or optical reading devices that are incorporated along the track. In their desire to clear the machine as quickly as possible to resume operations, operators have occasionally so damaged the machine with improvised implements to put it out of action for hours or even days.

SUMMARY

In contrast to the "external" jam-relief tools and expedients noted above, all requiring operator labor and time, we have devised a track-clearing proxy-document. Such a document need only be fed along the machine track, in the fashion of a check or other document, to sweep the track of jam-causing debris such as paper scraps, loose staples, or the like. It is further possible to sweep such debris to a sort-pocket or like exit-site for collection and removal.

In the normal operation of a document processor, staples, small pieces of the documents, and other debris can become dislodged from the documents being processed. Often small pieces of paper, staples, and other debris are left in the paper path of the document processor. This debris can cause subsequent documents to stall and/or get jammed in the paper path. One purpose of the proxy document is to remove such debris.

A clearance tool or proxy document constructed according to the invention is loaded into a document processor and passed down the paper path just like any other document. This tool or document clears the debris from the paper path and eliminates the possible damage from improper use of ad hoc tools or implements.

BRIEF DESCRIPTION OF DRAWING FIGURES

Those skilled in the art will appreciate these and other features and advantages of the present invention, as these features and advantages are better understood by reference to the following detailed descriptions of the invention. This description should be considered in conjunction with the accompanying drawings and figures, wherein like reference symbols denote like elements.

Dimensions are shown, as adapted to use in certain machines; however, these dimensions are merely exemplary, and the invention is capable of being constructed in a wide range of profiles and sizes, as required by the geometry of a given machine.

DESCRIPTION OF EXEMPLARY EMBODIMENT

Overview of Exemplary Embodiment

Figure 1:
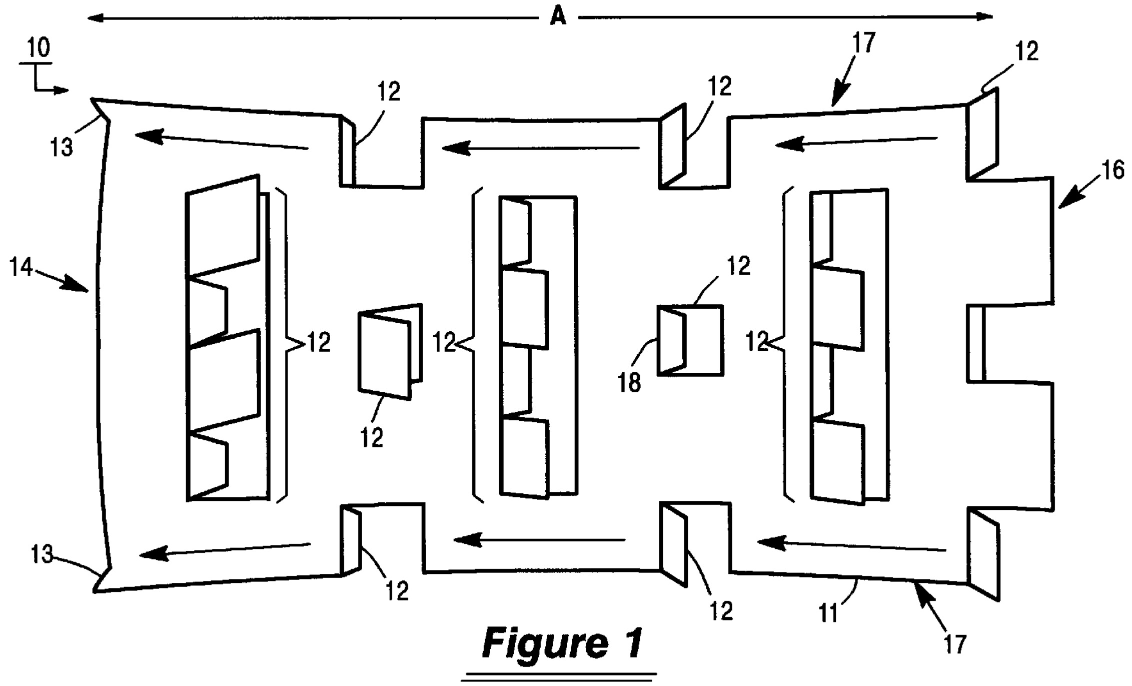
FIG. 1 is a side elevation view of an exemplary embodiment of the invention.
Figure 2:
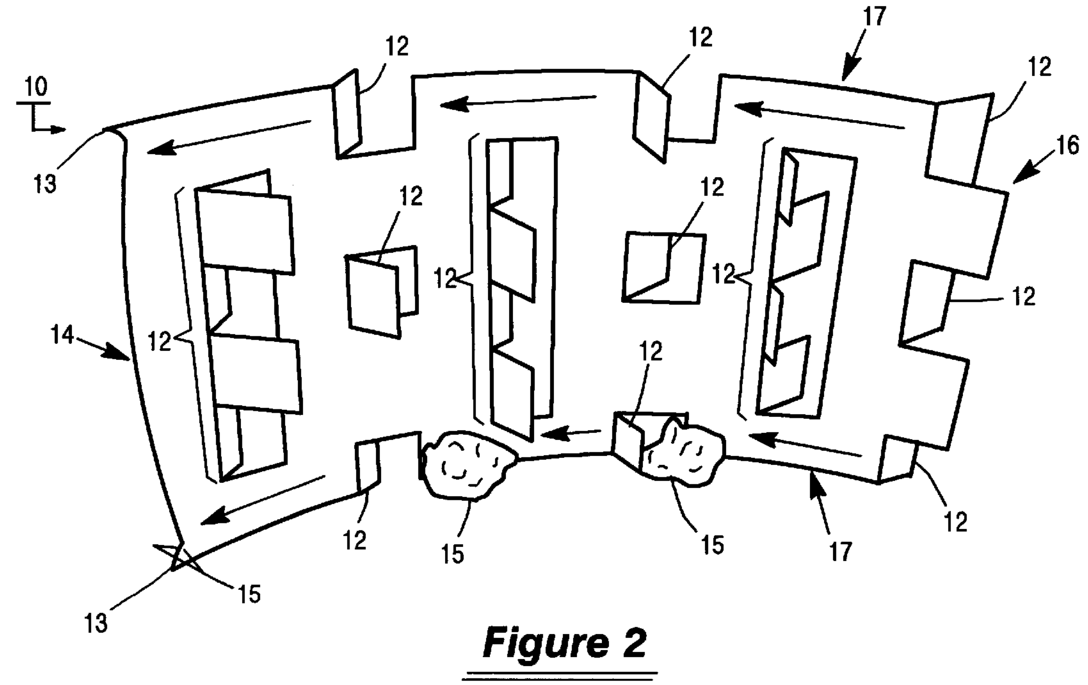
FIG. 2 is another side elevation view of an exemplary embodiment of the invention, but with the card in a slightly curved profile.

FIGS. 1 and 2 are side elevation views of an exemplary embodiment of the invention. The invention provides a card 10 for cleaning a document track 19 of a document handling system. The card 10 comprises a planar body 11 formed of a resilient material. The body 11 includes a plurality of tabs 12, with each one of the tabs 12 being pivotable relative to the body 11 between an extended position and a collapsed position. In the extended position, the tab 12 projects angularly from the body 11. In the collapsed position, the tab 12 is substantially co-planar with the body 11. The tabs 12 are biased to the extended position to allow them to extend fully across the document track 19 and sweep debris 15 along the document track 19 as the card 10 is driven along the document track 19. According to various embodiments of the invention, the body 11 can include at least one hook-corner 13 to lift debris 15 from the floor of the document track 19. If provided with two hook-corners on each corner of the leading edge 14 of the body 11, the card 10 is symmetric around its lengthwise axis, lending itself the flip-and-reuse function described above.

The invention provides a method of producing a card 10 for clearing a document track 19 of a document handling system. According to an exemplary embodiment of the invention, this method comprises the following steps. Provide a planar body 11 formed of a resilient material. Provide the body 11 with a plurality of tabs 12, with each one of the tabs 12 being pivotable relative to the body 11 between an extended position and a collapsed position, as described above. Finally, bias the tabs 12 to the extended position, such as by creasing the material forming the body 11.

According to further exemplary embodiments of the invention, the body 11 can be provided with at least one hook-corner 13 at the leading edge 14 of the card 10. Such a hook-corner 13 is especially suitable for engaging debris 15, such as staples or paper clips lying in the document track 19, and lifting such debris 15 from the document track 19. The tabs 12 can then sweep along such debris 15. In addition, the body 11 can be provided with at least a second hook corner 13, also on the leading edge 14 of the card 10. This construction makes the card 10 symmetric about its lengthwise axis A, thereby allowing the card 10 to be used with a first lengthwise side 17 down against the document track 19 until the hook-corner 13 on that side is worn. After that first side is worn, the card 10 can be flipped over to its new side and re-used.

As explained in more detail below, the body 11 can be formed of a fibrous or a polymeric material. According to various embodiments of the invention, the body 11 includes a plurality of rectangular tabs 12 that may be formed by making cuts in the body 11 and hinging the tab 12 to the body 11. This cut can be made by a punching or cutting process. Depending on where a given tab 12 is located on the body 11, this process can include making one, two, or more cuts in the body 11, and hinging the tab 12 to the body 11 along a hinge line 18. The tab 12 can be rectangular or any other convenient shape.

Depending on the shape and the location of the tab 12 on the body 11, the tab 12 may be formed by making two orthogonal or parallel cuts in the body 11 and hinging the tab 12 to the body 11. Specifically, if the tabs 12 are on the trailing edge 16 of the body 11, then each single lengthwise cut will form two adjacent rectangular tabs 12. However, if the tab 12 is along the lengthwise edge 17 of the body 11, two orthogonal cuts will form a single rectangular tab 12. Finally, if a tab 12 is within the body 11 and not along any edges, then one, two, or three cuts may be necessary to form the tab 12, depending on the shape of the tab 12. Once the tabs 12 are formed, they are biased to extend angularly from the body 11 by creasing the body 11 at a hinge line 18 joining the tab 12 to the body 11. The tabs 12 can be extended to one or both sides of the body 11, depending the requirements of a given application. In an exemplary embodiment, the tabs 12 are arranged in a staggered configuration, with certain tabs 12 being biased to extend toward a first side of the body 11, and other tabs 12 biased to extend toward the opposite side of the body 11.

The invention also provides a method of clearing debris 15 from a document track 19 of a document handling system. An exemplary method of clearing debris 15 comprises the following steps. Provide a card 10 having a body 11 and a plurality of tabs 12 biased to project angularly from the body 11. Place the card 10 into the document track 19, and drive the card 10 along the document track 19, engaging any debris 15 in the document track 19 with the tabs 12. As the card 10 is driven along the document track 19, it sweeps the debris 15 along the document track 19 with the tabs 12. The card 10 can drive the debris 15 into a collection pocket provided by the document handling system. As discussed in further detail below, the tabs 12 collapse against toward the body 11 when the card 10 enters a mechanism (such as a driving belt or roller 22) that drives a document along the document track 19. The tabs 12 expand when the card 10 exits the mechanism. The one or more hook-corners 13 provided by the body 11 of the card 10 engages debris 15, such as staples, loose paper, or paper clips, lying along the bottom of the document track 19, and tend to lift such debris 15 to be swept along by the tabs 12. For particularly stubborn debris 15, the card 10 can be repeatedly driven along the document track 19 if necessary to urge the debris 15 along the document track 19 a little at a time.

Figure 3:
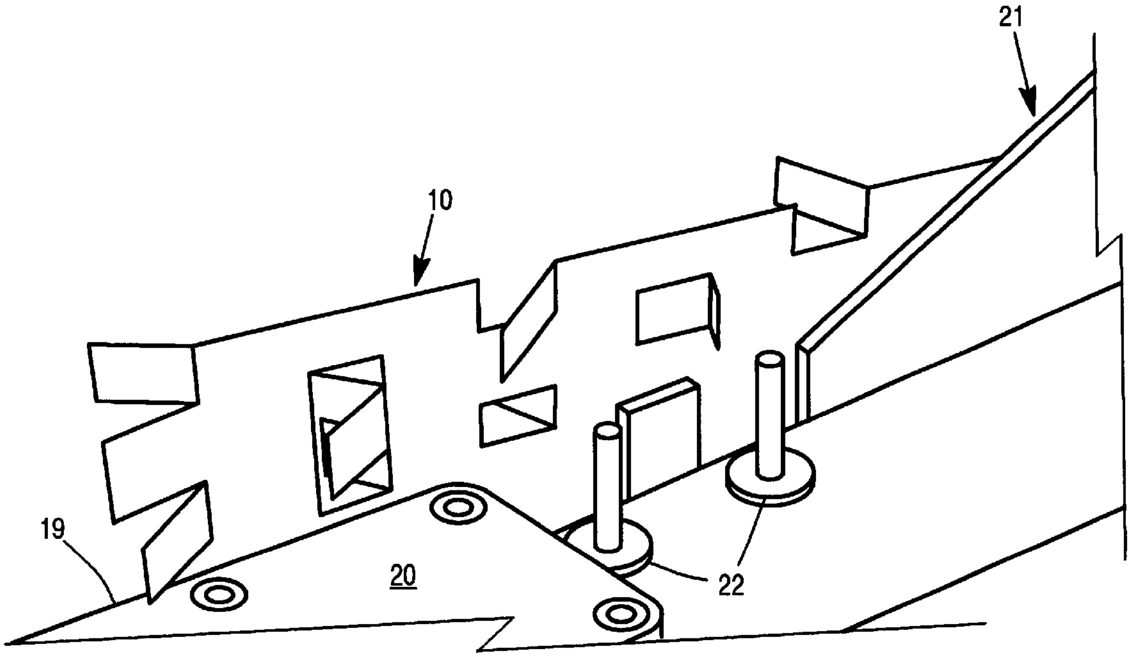
FIG. 3 is a perspective view of an exemplary embodiment of the invention passing through a document track, past a pair of rollers that drive documents along the track.

FIG. 3 shows a document track 19 susceptible of a jam condition in a document-processing machine 20 suitable for using an exemplary embodiment of the invention. The documents to be transported are constrained between parallel vertical track walls 21, with one wall 21 on each side of the document, and with the walls 21 rising above a track base element. The documents are driven by means of rotating, compliant rollers 22, with tires shown removed here for illustration, and may be driven by a pair of drive belt means. Additional driving means may be provided to urge the bottom edge of the document down against the track base, to help ensure that the document is correctly aligned vertically at all times.

Figure 4:
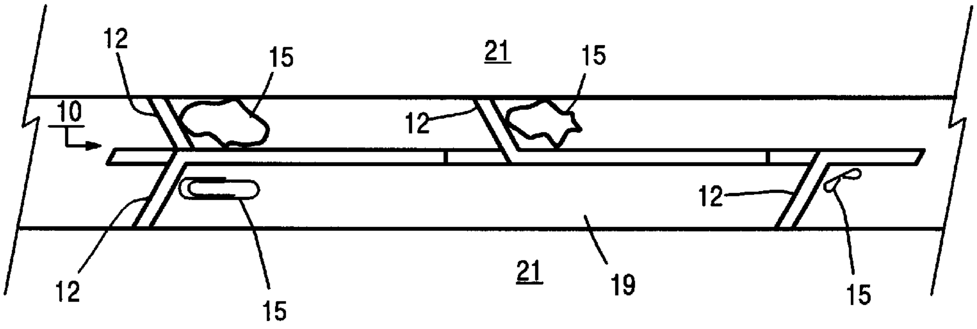
FIG. 4 is a top plan view of an exemplary embodiment of the invention passing through a document track.

FIG. 4 further illustrates the snug fit between the card 10 and the vertical walls 21 of document track 19. The card 10 captures and sweeps along any debris 15 in the paper path, and ultimately deposits that debris 15 into a document collection pocket (not shown) provided by the document processor, where an operator can easily remove the debris 15 by hand.

In an exemplary embodiment, the card 10 is made somewhat like a check or other unit record that can be driven along the document track 19. In an exemplary embodiment, the card 10 preferably has a height and length comparable to a check or like machine document. An exemplary height may be for example 2.5 to 3" high, so that, like a check, the card 10 protrudes above the vertical track walls 21, and can easily be seen, and extracted if necessary. An exemplary length may be about 4–6" long, or enough to span the distances between all driving rollers 22 in the document path.

The card 10 may be constructed from several different materials. In an exemplary embodiment, the card 10 is formed of a fabric such as that available under the tradename NOMEX from DuPont, Inc. of Wilmington, Del. The material chosen for the card 10, whether it be NOMEX or a like material, should be tough, durable, flexible yet tear-resistant, and have frictional characteristics sufficient to allow the roller 22 to effectively engage and drive the card 10 along the document track 19. Further, the material should be sufficiently flexible, yet rigid and resilient enough to project tabs 12 on opposite sides of the card 10 to exceed the width of the document track 19, better to sweep and clear debris 15 along all surfaces and walls 21 of the document track 19. Specifically, the material should have enough inherent stiffness to allow the tabs 12 to maintain their projected positions once they are formed into those positions, such as by creasing during manufacture. The natural resilience of the tabs 12 urges or biases them out against the walls 21, yet they accommodate repeated runs and driving engagement with machine rollers 22, which collapse these tabs 12, and then the tabs 12 spring-back or rebound upon exiting the rollers 22. In experimental use, NOMEX is quite durable and tear-resistant. These characteristics are especially important when the card 10 must be repeatedly run through a machine 20 to nudge debris 15 along a few niches at a time.

All tabs 12 and tab 12-holes may be alike, and be disposed symmetrically and staggered on opposite sides of the card 10, and thus can readily be punched-out by machine during manufacture. Specifically, note that in the exemplary embodiment shown in FIG. 1, the row of tabs 12 disposed along the bottom edge of the card 10 projects tabs 12 to alternating sides of the card 10 to ensure adequate coverage of the document track 19. The remaining rows of tabs 12 can be arranged similarly. These opposing tabs 12 allow the card 10, as it is driven along the document track 19, to span the entire width of the document track 19 to “wipe”0 and sweep along all sections of the track walls 21, and thus to drive any collected debris 15 to an exit-site.

Other materials have been tried experimentally, such as polypropylene and Mylar, but these materials seem too slippery to be properly driven by machine rollers 22. Paper may work well for a limited time, but its durability in repeated use may be questionable. Metal may not be flexible enough to negotiate easily all turns in the paper path. Plastics, such as polycarbonate available under the tradename LEXAN from General Electric, may likely to be too smooth and slick to frictionally engage the drive-rolls adequately, for example to advance the card 10 with a staple hooked thereon. However, such plastic material will not likely damage metal or plastic parts along a document track 19, and may be preferable in certain applications.

The material may have a thickness that is selected to occupy most, or all, of the minimum width of the document track 19. The LEXAN or NOMEX material is selected because of its intrinsic toughness, durability, resiliency, and flexibility, especially for turns and for spring-like compression and expansion of the tabs 12 when entering and leaving a pinch roller 22. Further desirable characteristics are a compliant and non-marring surface that will minimally damage the documents, the document track 19, and surrounding components of the machine 20, no matter how vigorously and repeatedly the card 10 is used.

Another feature of the card 10 is that its leading edge 14 is preferably formed to project upper and lower hook-corners 13. These hook-corners 13 can engage and lift debris 15 lying on the base of the document track 19, such as stray staples or pieces of paper, and urge them upward, to be thereafter swept along the document track 19 by tabs 12.

Also, in an exemplary embodiment, the card 10 is symmetrical about its lengthwise axis, typically its horizontal axis A as shown in FIG. 1. When the card 10 is lengthwise symmetrical, tabs 12 and hook-corners 13 become reversible in a sense, so the card 10 can be turned upside down. For example, if one of the hook-corners 13 became deformed, then and the card 10 can be reversed and still function effectively on its "new" side.

In exemplary embodiments of the card 10, thicknesses may vary between 7 and 14 mils. Embodiments that are much thinner than this range may be too flimsy to reliably engage debris 15 in the document track 19, while embodiments that are much thicker than this range can be difficult to maneuver between the driving elements and can cause jams. Thicknesses toward the lower end of this range, about 2–15 mils, may be preferable for most applications. The increased flexibility of a card 10 sized to these dimensions makes the card 10 easier to maneuver into and out of the document track 19. However, the tabs 12 extending from the body 11 of the card 10 still retain sufficient rigidity to reliably engage and extract foreign objects from the document track 19. In addition, the thinner embodiments are adapted for use in wider range of machines, since they will fit into a wider range of track widths. The card 10 should be long enough to be "gripped" simultaneously by consecutive rollers 22.

Of course, certain modifications to the described preferred embodiment are possible without departing from the spirit of the present invention. For example, there are other ways to provide the present invention so it is not limited to the particular form illustrated or for use in the particular illustrated type of machine. Additionally, some features of the present invention can be used to advantage without the corresponding use of other features. Specifically, the arrangement of the tabs 12 as shown in FIGS. 1 and 2 may be varied within the scope of the invention, with certain of the tabs 12 deleted or reconfigured as dictated by the circumstances and economies of a given application.

Accordingly, the description of the preferred embodiment should be to be considered as including all possible modifications and variations coming within the scope of the invention as defined by the appended claims.

In conclusion, it will be understood that the preferred embodiment(s) described herein are only exemplary, and that the invention is capable of many modifications and variations of construction, arrangement and use without departing from the spirit of the claims. The examples of possible variations of the present invention are merely illustrative, and accordingly, the present invention is to be considered as including all possible modifications and variations coming within the scope of the invention as defined by the claims appended hereto.

What is claimed is:

1. A card for cleaning a document track of a document handling system, the card comprising:

a body being formed of a resilient material and being planar, wherein the body includes at least one hook-corner;

the body including a plurality of tabs, each one of the tabs being pivotable relative to the body between an extended position wherein the tab projects angularly from the body, and a collapsed position wherein the tab is substantially co-planar with the body; and the tabs being biased to the extended position.

2. The card of claim 1, wherein the body has a lengthwise axis and the body is symmetric around the lengthwise axis.

3. The card of claim 1, wherein the body is formed of a fibrous material.

4. The card of claim 1, wherein the body is formed of a polymeric material.

5. The card of claim 1, wherein a first plurality of the tabs are biased to extend to a first side of the body, and wherein a second plurality of the tabs are biased to extend to an opposite side of the body.

6. The card of claim 1, wherein at least one of the tabs includes three sides and is disposed along a periphery of the body such that a first and a second side of the tab are formed by making only two orthogonal cuts in the body, and wherein a third side of the tab is coincident with the side of the body.

7. A card for cleaning a document track of a document handling system, the card comprising:

a body being formed of a resilient material and being planar;

the body including a plurality of tabs, each one of the tabs being pivotable relative to the body between an extended position wherein the tab projects angularly from the body, and a collapsed position wherein the tab is substantially co-planar with the body, wherein at least one of the tabs includes three sides and is disposed along a periphery of the body such that a first and a second side of the tab are formed by making only two orthogonal cuts in the body, and wherein a third side of the tab is coincident with the side of the body and the tabs being biased to the extended position.

8. The card of claim 7, wherein the body includes at least one hook-corner.

9. The card of claim 7, wherein the body has a lengthwise axis and the body is symmetric around the lengthwise axis.

10. The card of claim 7, wherein the body is formed of a fibrous material.

11. The card of claim 7, wherein the body is formed of a polymeric material.

12. The card of claim 7, wherein a first plurality of the tabs are biased to extend to a first side of the body, and wherein a second plurality of the tabs are biased to extend to an opposite side of the body.

13. A card for cleaning a document track of a document handling system, the card comprising:

a body being formed of a resilient material and being planar;

the body including a plurality of tabs, each one of the tabs being pivotable relative to the body between an extended position wherein the tab projects angularly from the body, and a collapsed position wherein the tab is substantially co-planar with the body; and the tabs being biased to the extended position, with a first plurality of the tabs being biased to extend to a first side of the body, and a second plurality of the tabs being biased to extend to an opposite side of the body.

14. The card of claim 13, wherein the body includes at least one hook-corner.

15. The card of claim 13, wherein the body has a lengthwise axis and the body is symmetric around the lengthwise axis.

16. The card of claim 13, wherein the body is formed of a fibrous material.

17. The card of claim 13, wherein the body is formed of a polymeric material.

18. The card of claim 13, wherein at least one of the tabs includes three sides and is disposed along a periphery of the body such that a first and a second side of the tab are formed by making only two orthogonal cuts in the body, and wherein a third side of the tab is coincident with the side of the body.

* * * * *

US006243908C1

(12) EX PARTE REEXAMINATION CERTIFICATE (6007th)

United States Patent

Battle et al.

(10) Number: US 6,243,908 C1

(45) Certificate Issued: Nov. 13, 2007

(54) TRACK CLEARANCE CARD AND METHODS OF MAKING AND USING THE SAME

(75) Inventors: William Froman Battle, Canton, MI (US); Ronald G. Shell, Bloomfield Hills, MI (US); Dawn M. Erickson, Westland, MI (US)

(73) Assignee: Unisys Corporation, Blue Bell, PA (US)

Reexamination Request:
No. 90/007,157, Aug. 6, 2004

Reexamination Certificate for:
Patent No.: 6,243,908
Issued: Jun. 12, 2001
Appl. No.: 09/288,591
Filed: Apr. 8, 1999

Related U.S. Application Data

(60) Provisional application No. 60/081,150, filed on Apr. 9, 1998, now abandoned.

(51) Int. Cl.
*B65H 7/00* (2006.01)
*G07D 11/00* (2006.01)

(52) U.S. Cl. ........................ 15/210.1; 15/256.51; 271/1; 428/119; 428/120; 428/132

(58) Field of Classification Search ................ 15/210.1, 15/256.51, 208, DIG. 12; 428/119, 120, 132, 428/80, 81; 271/1
See application file for complete search history.

(56) References Cited

U.S. PATENT DOCUMENTS

| | | | | | |
|---|---|---|---|---|---|
| 2,316,819 | A | * | 4/1943 | Tedrow | 52/564 |
| 3,051,453 | A | * | 8/1962 | Sluijters | 366/337 |
| 5,153,964 | A | | 10/1992 | Gelardi et al. | |
| 6,086,968 | A | * | 7/2000 | Horovitz | 428/36.1 |

* cited by examiner

*Primary Examiner*—Alan Diamond

(57) ABSTRACT

A card is provided for cleaning a document track of a document handling system, and methods for making and using the same. The card includes a planar body formed of a resilient material, such as a fibrous or polymeric material. The body includes a plurality of tabs, with each one of the tabs being pivotable relative to the body between an extended position and a collapsed position. In the extended position, the tab projects angularly from the body, while in the collapsed position, the tab is substantially co-planar with the body. The tabs are biased to the extended position, such as by creasing the material forming the body. The biased tabs extended across the document track, and sweep debris along the document track.

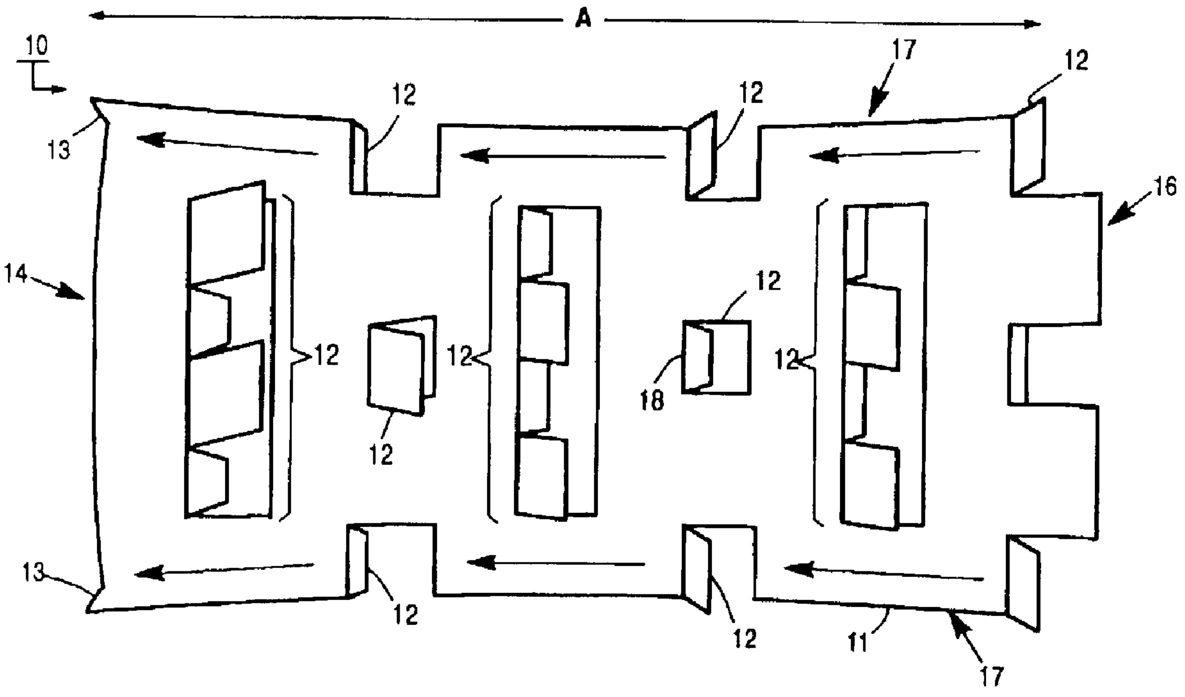

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–18 are cancelled.

New claims 19–33 are added and determined to be patentable.

*19. In a document handling system having a document track with track walls for constraining documents driven along said track, said document handling system including a card for cleaning said document track, said card comprising:*

*a body being formed of a resilient material and being planar, wherein the body includes at least one hook-corner;*

*said body including a plurality of tabs, each one of the tabs being pivotable relative to the body between an extended position wherein the tab projects angularly from the body sufficiently to extend to a wall of said track when the card is driven along said track, and a collapsed position wherein the tab is substantially co-planar with the body to permit the card to pass through narrowed portions of said track, said tabs springing back after exiting said narrowed portions, said tabs being biased to said extended position so that when said card is driven along said track said tabs will sweep debris along said track as said card is driven.*

*20. The document handling system of claim 19, wherein the body has a lengthwise axis and the body is symmetric around the lengthwise axis.*

*21. The document handling system of claim 19, wherein the body is formed of a fibrous material.*

*22. The document handling system of claim 19, wherein the body is formed of a polymeric material.*

*23. The document handling system of claim 19, wherein at least one of the tabs includes three sides and is disposed along a periphery of the body such that a first and a second side of the tab are formed by making only two orthogonal cuts in the body, and wherein a third side of the tab is coincident with the side of the body.*

*24. In a document handling system having a document track with track walls for constraining documents driven along said track, said document handling system including a card for cleaning said document track, said card comprising;*

*a body being formed of a resilient material and being planar, wherein the body includes at least one hook-corner;*

*said body including a plurality of tabs, each one of the tabs being pivotable relative to the body between an extended position wherein the tab projects angularly from the body sufficiently to extend to a wall of said track when the card is driven along said track, and a collapsed position wherein the tab is substantially co-planar with the body to permit the card to pass through narrowed portions of said track, said tabs springing back after exiting said narrowed portions, said tabs being biased to said extended position so that when said card is driven along said track said tabs will sweep debris along said track as said card is driven;*

*each tab including three sides and disposed along a periphery of the body such that a first and a second side of the tab are formed by making only two orthogonal cuts in the body, and wherein a third side of the tab is coincident with the side of the body.*

*25. The document handling system of claim 24, wherein the body is formed of a fibrous material.*

*26. The document handling system of claim 24, wherein the body is formed of a polymeric material.*

*27. The document handling system of claim 24, wherein a first plurality of the tabs are biased to extend to a first side of the body, and wherein a second plurality of the tabs are biased to extend to an opposite side of the body.*

*28. In a document handling system having a document track with track walls for constraining documents driven along said track, said document handling system including a card for cleaning said document track, said card comprising:*

*a body being formed of a resilient material and being planar, wherein the body includes at least one hook-corner;*

*said body including a plurality of tabs, each one of the tabs being pivotable relative to the body between an extended position wherein the tab projects angularly from the body sufficiently to extend to a wall of said track when the card is driven along said track, and a collapsed position wherein the tab is substantially co-planar with the body to permit the card to pass through narrowed portions of said track, said tabs springing back after exiting said narrowed portions, said tabs being biased to said extended position so that when said card is driven along said track said tabs will sweep debris along said track as said card is driven;*

*the tabs being biased to the extended position, with a first plurality of the tabs being biased to extend to a first side of the body, and a second plurality of the tabs being biased to extend to an opposite side of the body.*

*29. The document handling system of claim 28, wherein the body has a lengthwise axis and the body is symmetric around the lengthwise axis.*

*30. The document handling system of claim 28, wherein the body is formed of a fibrous material.*

*31. The document handling system of claim 28, wherein the body is formed of a polymeric material.*

*32. The document handling system of claim 28, wherein at least one of the tabs includes three sides and is disposed along a periphery of the body such that a first and a second side of the tab are formed by making only two orthogonal cuts in the body, and wherein a third side of the tab is coincident with the side of the body.*

*33. The document handling system of claim 28, wherein each of said tabs is formed by making cuts in said body which pass completely through the body from one side to the other side such that each tab is hinged to said body along a hinge line joining the body so that each tab can be biased to extend angularly from either side of the body.*

* * * * *